US010093569B2

(12) United States Patent
Krall et al.

(10) Patent No.: US 10,093,569 B2
(45) Date of Patent: Oct. 9, 2018

(54) DIFFUSED AERATION SYSTEMS AND METHODS FOR CLEANING FOULED DIFFUSERS IN AERATION SYSTEMS

(71) Applicant: Xylem Water Solutions U.S.A., Inc., Brown Deer, WI (US)

(72) Inventors: Joseph G. Krall, Grafton, WI (US); Scott Hatch, Sussex, WI (US); Jesse Jones, Mequon, WI (US)

(73) Assignee: XYLEM WATER SOLUTIONS U.S.A., INC., Brown Deer, WI (US)

( * ) Notice: Subject to any disclaimer, the term of this patent is extended or adjusted under 35 U.S.C. 154(b) by 266 days.

(21) Appl. No.: 14/828,567

(22) Filed: Aug. 18, 2015

(65) Prior Publication Data

US 2016/0046516 A1 Feb. 18, 2016

Related U.S. Application Data

(60) Provisional application No. 62/038,643, filed on Aug. 18, 2014.

(51) Int. Cl.

| | |
|---|---|
| *C02F 3/20* | (2006.01) |
| *B08B 3/08* | (2006.01) |
| *B08B 9/027* | (2006.01) |
| *B08B 9/08* | (2006.01) |

(52) U.S. Cl.
CPC .............. *C02F 3/20* (2013.01); *B08B 9/0856* (2013.01); *C02F 2303/14* (2013.01); *C02F 2303/22* (2013.01); *Y02W 10/15* (2015.05)

(58) Field of Classification Search
CPC .... C02F 3/20; C02F 3/201; C02F 1/76; C02F 2303/14; C02F 2303/22; B08B 3/04; B08B 3/08; B08B 3/10; B08B 3/102; B08B 3/108; B08B 5/02; B08B 9/0856
See application file for complete search history.

(56) References Cited

U.S. PATENT DOCUMENTS

| | | | |
|---|---|---|---|
| 2,689,714 | A | 9/1954 | French |
| 4,639,314 | A | 1/1987 | Tyer |
| 4,889,620 | A | 12/1989 | Schmit et al. |
| RE33,177 | E | 3/1990 | Schmit et al. |
| 5,051,193 | A | 9/1991 | Cummings, Jr. |
| RE33,899 | E | 4/1992 | Tyer |
| 5,328,601 | A | 7/1994 | Schmidt et al. |
| 5,348,650 | A | 9/1994 | Cummings, Jr. |
| 5,378,355 | A | 1/1995 | Winkler |
| 5,597,491 | A | 1/1997 | Winkler |
| 6,200,468 | B1 | 3/2001 | Schmit et al. |
| 6,475,395 | B1 | 11/2002 | Schmit et al. |
| 6,524,481 | B2 | 2/2003 | Zha et al. |
| 6,616,843 | B1 | 9/2003 | Behmann et al. |

(Continued)

*Primary Examiner* — Pranav N Patel
(74) *Attorney, Agent, or Firm* — The Webb Law Firm (57) ABSTRACT

A method for cleaning and preventing diffuser membrane fouling of an aeration system can include: transporting a liquid acidic solution into a downcomer pipe or a purge line positioned in a reservoir of an aeration system containing a body of water such that the liquid acidic solution flows into a manifold and air distribution pipes; allowing the liquid acidic solution to vaporize; and blowing the vaporized acidic solution into a plurality of diffusers supported by the air distribution pipes. An aeration system that can implement the method is also included.

13 Claims, 6 Drawing Sheets

(56) References Cited

U.S. PATENT DOCUMENTS

| | | |
|---|---|---|
| 6,682,652 B2 | 1/2004 | Mahendran et al. |
| 7,179,370 B2 | 2/2007 | Dimitriou et al. |
| 7,476,322 B2 | 1/2009 | Dimitriou et al. |
| 7,931,802 B2 | 4/2011 | Nishimori et al. |
| 8,252,184 B2 | 8/2012 | Wan et al. |
| 2006/0081534 A1* | 4/2006 | Dimitriou ............ B01D 61/145 210/620 |
| 2010/0101997 A1 | 4/2010 | Tateishi |
| 2010/0213124 A1 | 8/2010 | Takabatake et al. |
| 2010/0300968 A1 | 12/2010 | Liu et al. |
| 2012/0187048 A1 | 7/2012 | Jenkins et al. |

\* cited by examiner

Transporting a liquid acidic substance into a downcomer pipe or a purge line positioned in a reservoir of an aeration system containing a body of water

⇒

Allowing the liquid acidic substance to vaporize

⇒

Blowing the vaporized acidic substance into diffusers positioned in the reservoir for distributing air into the body of water

⇒

Mixing the vaporized acidic substance with water on the surface and inside of the diffusers to re-liquefy the vaporized acidic substance

FIG. 6

DIFFUSED AERATION SYSTEMS AND METHODS FOR CLEANING FOULED DIFFUSERS IN AERATION SYSTEMS

CROSS REFERENCE TO RELATED APPLICATIONS

This application claims priority to U.S. Provisional Patent Application No. 62/038,643 filed Aug. 18, 2014, which is incorporated herein by reference in its entirety.

BACKGROUND OF THE INVENTION

Field of the Invention

The present invention is directed to a system and a method for cleaning diffused aeration systems, and, in particular, an aeration system and a method for cleaning diffuser fouling.

Description of Related Art

Fine bubble aeration systems with diffusers are commonly made of porous materials or polymeric materials with cut holes or slits. Operation of these systems can be continuous or intermittent. While these systems are useful for aerating wastewater, they are susceptible to fouling when submerged in a wastewater environment. There are two types of fouling that commonly occur. Type 1 fouling is caused by inorganic materials and water hardness. Particularly, when the water conditions are right, water hardness and inorganic materials fill the pores or slits of the diffuser causing a pressure increase and eventually failure of the diffuser. Type 2 fouling is organic fouling. In wastewater environments, organic bacteria is grown to remove unwanted constituents. These bacteria may enter the pores of porous diffusers causing clogging or attach themselves to the polymeric materials and grow a thick layer causing coalescence of fine bubbles which also increases pressure and decreases efficiency similar to type 1 fouling.

While various methods and apparatuses have been developed to overcome these drawbacks, fouling of aeration systems is still a concern. Thus, there is a need for improved methods and apparatuses to clean and remove fouling of aeration systems such as diffuser fouling.

SUMMARY OF THE INVENTION

In certain embodiments, the present invention is directed to a method for cleaning diffusers in an aeration system that includes: transporting a liquid acidic solution into a downcomer pipe or a purge line positioned in a reservoir of an aeration system containing a body of water such that the liquid acidic solution flows into a manifold and air distribution pipes; allowing the liquid acidic solution to vaporize; and blowing the vaporized acidic solution into a plurality of diffusers supported by the air distribution pipes. The method can further include mixing the vaporized acidic solution with water in and on the surface of the diffusers to re-liquefy the vaporized acidic solution. The re-liquefied acidic solution can dissolve mineral scale and inorganic materials and/or kill or destroy bacteria found in or on the diffusers.

The liquid acidic solution used with the method can include, but is not limited to, a diluted acid solution that vaporizes at acid concentrations of 10% by weight or greater within the aeration system. Non-limiting examples of suitable liquid acidic solutions include a liquid acidic solution comprising a hydrochloric acid concentration of 10% to 37% by weight, a formic acid concentration of 20% to 50% by weight, or a combination thereof.

Further, the liquid acidic solution is transported into the downcomer pipe and/or purge line in an amount and manner that prevents at least 90% of the liquid acidic solution delivered into the downcomer pipe and/or purge line from entering the plurality of diffusers in liquid form. In some embodiments, the liquid acidic solution is transported into the downcomer pipe and/or purge line as air is flowing through the downcomer pipe, manifold, and air distribution pipes. The liquid acidic solution can also be transported into the downcomer pipe and/or purge line in an amount sufficient to fill from 1% to 40% of the total volume of each individual air distribution pipe attached to the manifold. In some embodiments, the liquid acidic solution is transported into the downcomer pipe and/or purge line in an amount sufficient to fill from a ½ inch to ¾ of an inch deep in each of the air distribution pipes. The amount of liquid acidic solution transported into the downcomer pipe and/or purge line can be determined based on total pipe length, size, and amount used to form the manifold and aeration pipes.

In some embodiments, the liquid acidic solution is transported into the downcomer pipe and/or purge line by a vessel having an acid distribution line. The reservoir used with the present can include a pre-reaction zone, a main reaction zone, and a baffle wall separating the pre-reaction zone and main reaction zone. The baffle can include slots that allow fluid to flow between the pre-reaction zone and main reaction zone.

Further, the method described herein for cleaning diffuser fouling of an aeration system can be operated manually, semi-automatically, or fully automatically. The method can also be conducted in-situ during a water treatment process.

In certain embodiments, the present invention also includes an aeration system that includes: a reservoir containing a body of water; a downcomer pipe extending into the body of water contained in the reservoir; a manifold submerged within the body of water and connected to the downcomer pipe; a plurality of air distribution pipes submerged within the body of water and connected to the manifold; a plurality of diffusers supported by the air distribution pipes; optionally, a purge line extending into the body water and connected to the manifold or air distribution pipes; and means for providing a liquid acidic solution into the downcomer pipe and/or purge line such that the liquid acidic solution flows through the manifold and into the air distribution pipes where it is vaporized.

The means for providing a liquid acidic solution can include a vessel having an acid distribution line that is connected to the downcomer pipe and/or purge line. In addition, the reservoir can include a pre-reaction zone, a main reaction zone, and a baffle wall separating the pre-reaction zone and main reaction zone as previously described. In such embodiments, both the pre-reaction zone and main reaction zone can include a plurality of air distribution pipes and diffusers. Moreover, the means for providing the liquid acidic solution can be configured to supply the liquid acidic solution into the downcomer pipe and/or purge line in-situ during a water treatment process.

In some embodiments, the aeration system further includes a process controller that is configured to operate the aeration system semi-automatically or fully automatically.

DESCRIPTION OF THE INVENTION

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

Further, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 1:
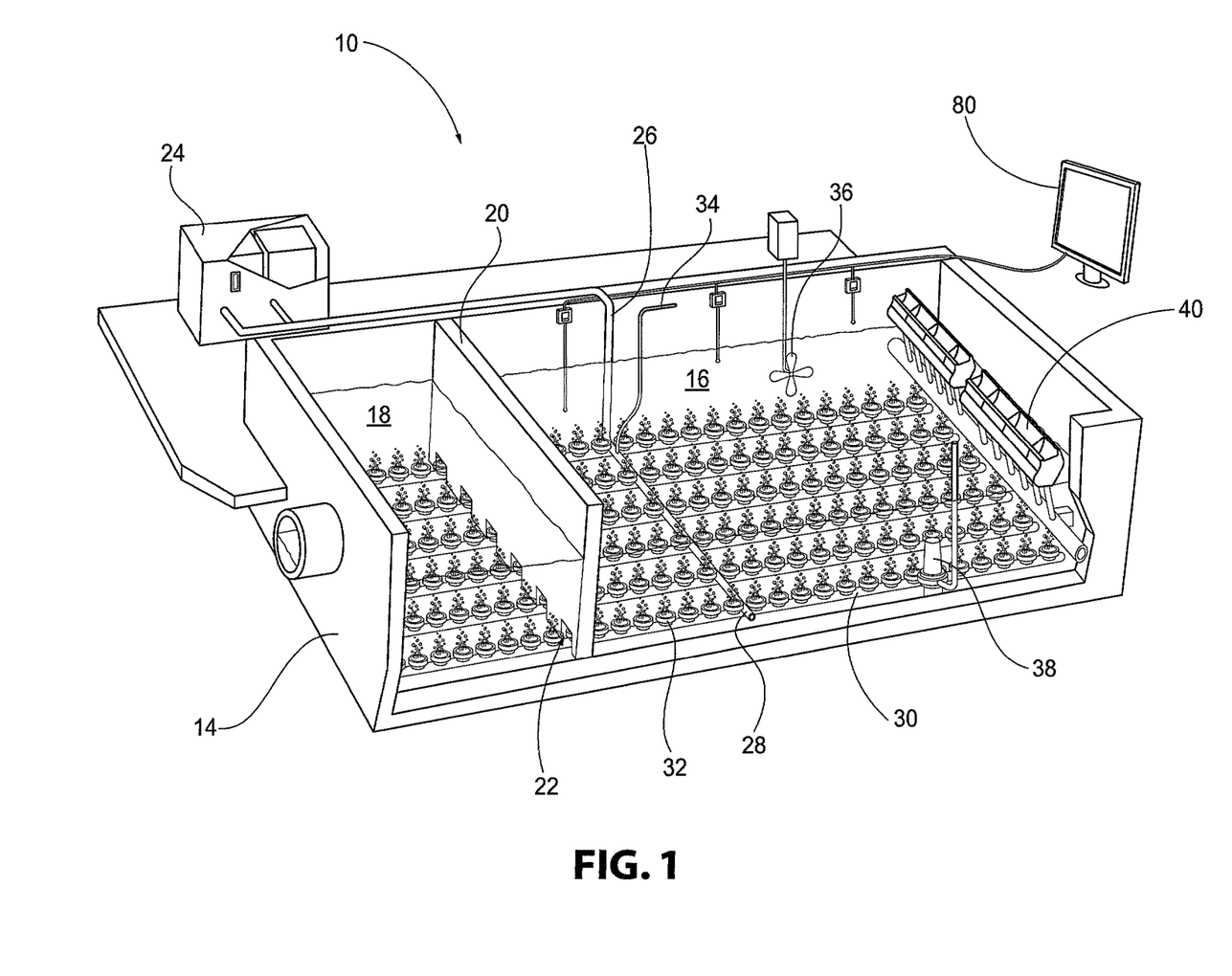
FIG. 1 is a perspective view of an aeration system according to one embodiment of the present invention.

As indicated, the present invention is directed to a system and method for cleaning fouling such as fouling found on ceramic diffusers and membrane diffusers 32 used in an aeration system 10. As shown in FIG. 1, the aeration system 10 includes a reservoir 14, such as a basin or other containment device that holds a body of water. The reservoir 14 can include a main reaction zone 16, and, optionally, a pre-reaction zone 18. When a pre-reaction zone 18 is used, a baffle wall 20 can be positioned between the main reaction zone 16 and the pre-reaction zone 18. The baffle wall 20 can further include ports 22 that allow water to flow from the pre-reaction zone 18 into the main reaction zone 16.

As further shown in FIG. 1, the aeration system 10 can include a blower 24 or other device that provides a source of air. The blower 24 can be connected to a downcomer pipe 26 that extends vertically into the reservoir 14. The term "downcomer pipe" is used interchangeably with the term "drop leg". The downcomer pipe 26 is connected to an air manifold 28 positioned along the bottom portion of the reservoir 14. Parallel rows of air distribution pipes 30 are connected to the air manifold 28. The air distribution pipes 30 also support a plurality of diffusers 32 that release air into the body of water contained in the reservoir 14. As used herein, a "diffuser" refers to a device that distributes oxygen, such as into a body of water. The diffusers 32 can include ceramic diffusers, membrane diffusers, or a combination thereof. Specific non-limiting examples of diffusers 32 that are suitable for use with the present invention include fine bubble diffusers and coarse bubble diffusers. To provide oxygen to a body water contained in the reservoir 14, blower 24 transports air through the downcomer pipe 26 and into the manifold 28, which then delivers the air to the air distribution pipes 30. The diffusers 32 that are supported and attached to the air distribution pipes 30 release the air flowing through the air distribution pipes 30.

In some embodiments, the air distributor pipes 30 and diffusers 32 form a grid along the entire bottom portion of the reservoir 14. For example, and as shown in FIG. 1, the downcomer pipe 26 can extend vertically into the reservoir 14 and connect to a manifold 28 that runs the width of the reservoir 14. A plurality of air distribution pipes 30 can then extend out from both sides of the manifold 28 to form parallel rows such that diffusers 32 are positioned along the entire length of the reservoir 14. When a baffle wall 20 is present, the air distribution pipes 30 can extend through the ports 22 so that diffusers 32 are positioned in both the pre-reaction zone 18 and main reaction zone 16.

Referring again to FIG. 1, the aeration system 10 can further include a purge line 34, such as a pipe or tubing, for example, that extends vertically into the reservoir 14. The purge line 34 can be connected to the manifold 28 or the air distribution pipes 30 extending along the bottom portion of the reservoir 14. The purge line 34 provides a passageway to an area above the body of water and can be used to remove condensate from the manifold 28 and/or air distribution pipes 30.

The aeration system 10 can also include mixing devices 36 such as propellers to mix the wastewater, pumps 38, and decanters 40 for removing clarified supernatant. It is appreciated that the pre-reaction zone 18, main reaction zone 16, or both, can include a downcomer pipe 26, a grid of diffusers 32 and aeration distribution pipes 30, purge lines 34, mixing devices 36, pumps 38, and other devices that can be used in an aeration system 10.

Figure 2:
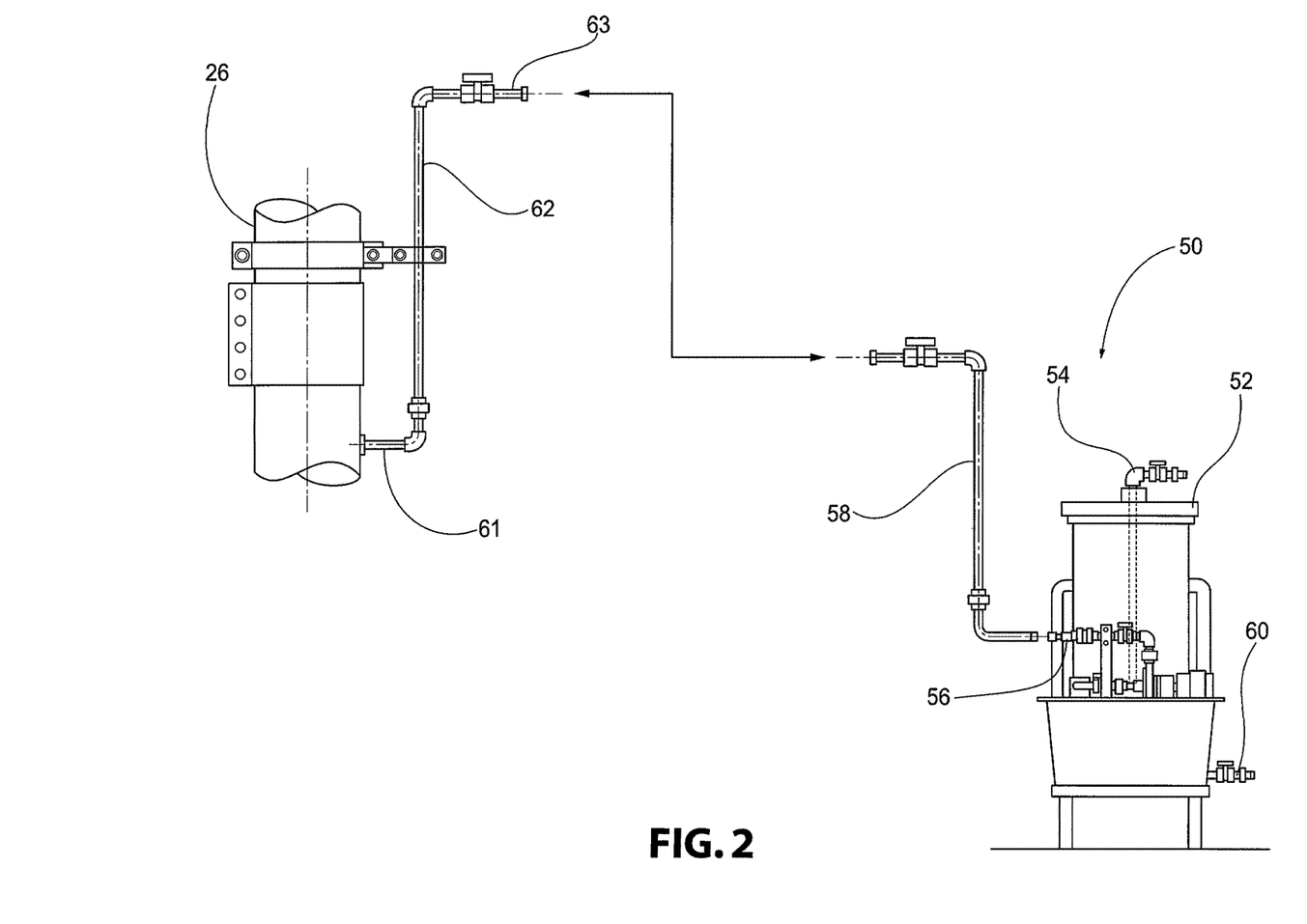
FIG. 2 is a cutaway of a vessel attached to a downcomer pipe through an acid delivery line according to one embodiment of the present invention.
Figure 3:
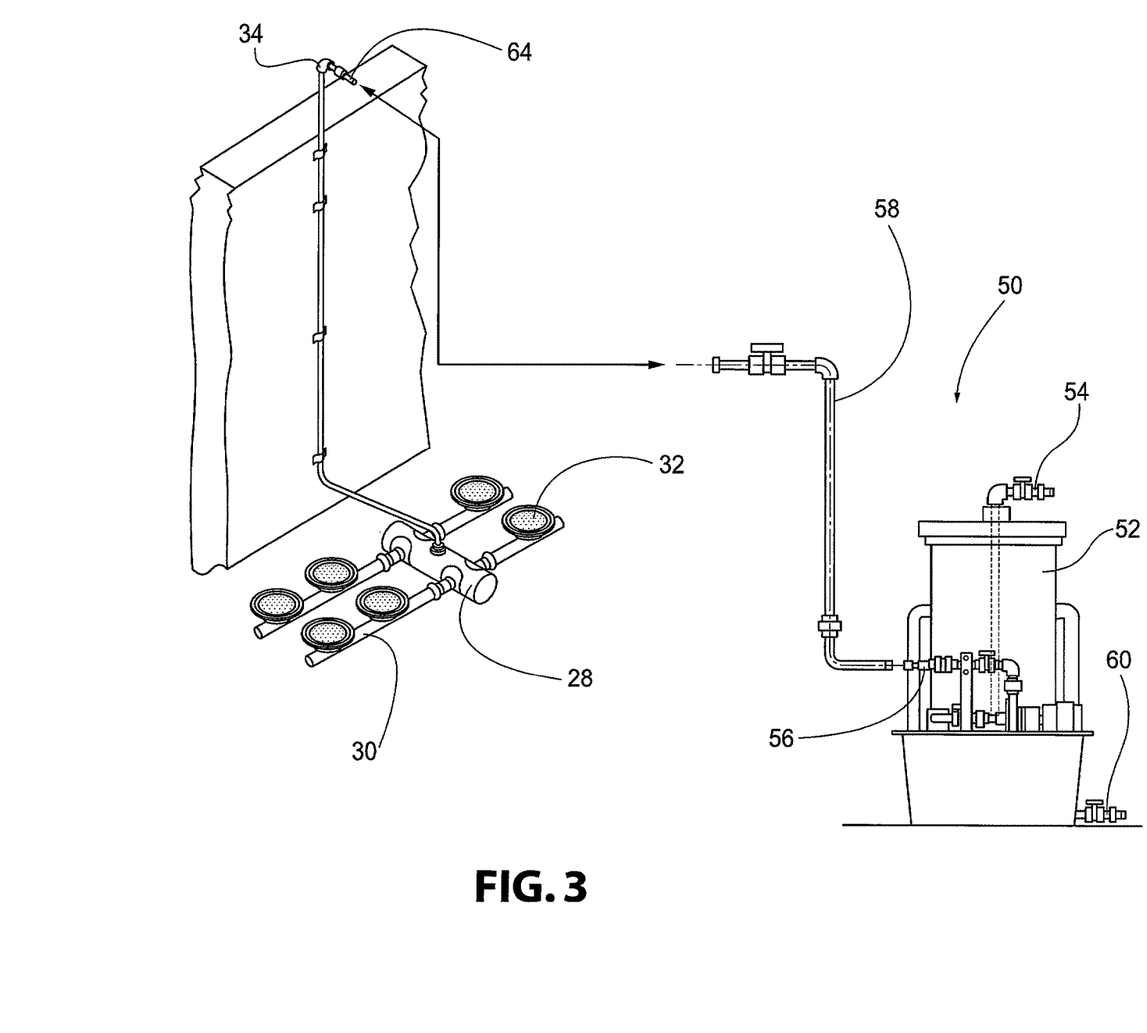
FIG. 3 is a cutaway of a vessel attached to a purge line through an acid delivery line according to one embodiment of the present invention.

In accordance with the present invention, the aeration system 10 can include a means 50 for distributing a liquid acidic solution, or mixture of liquid acidic solutions, into the downcomer pipe 26, purge line 34, or both. As used herein, a "liquid acidic solution" refers to a liquid solution with a pH of less 7, such as less than 6, less than 5, less than 4, less than 3, less than 2, less than 1, or less than 0. In some embodiments, as shown in FIGS. 2-3, the means 50 for distributing the liquid acidic solution, or mixture of liquid acidic solutions, includes a vessel 52 that is configured to hold and distribute the liquid acidic solution. The vessel 52 can include a liquid acid inlet 54, a fluid outlet 56, and an acid distribution line 58 connected to the fluid outlet 56 of the vessel 52. In some embodiments, the vessel 52 also includes a water inlet 60 that can be used to dilute the liquid acidic solution contained in the vessel 52. The acid distribution line 58 can include, but is not limited to, a hose, tubing, piping, or combinations thereof. As shown in FIG. 2, the acid distribution line 58 can be connected to a fluid inlet line 62, such as piping, that is in fluid communication with the downcomer pipe 26. For example, the fluid inlet line 62 can include a pipe with a first end 61 connected to a side of the downcomer pipe 26 and a second end 63 that can be connected to the acid distribution line 58. As shown in FIG. 3, the acid distribution line 58 can also be connected to an inlet valve 64 of the purge line 34. In some embodiments, the purge line 34 is connected to the manifold 28 as shown in FIG. 3. In other embodiments, the purge line 34 is connected to the air distribution pipes 30.

Figure 4:
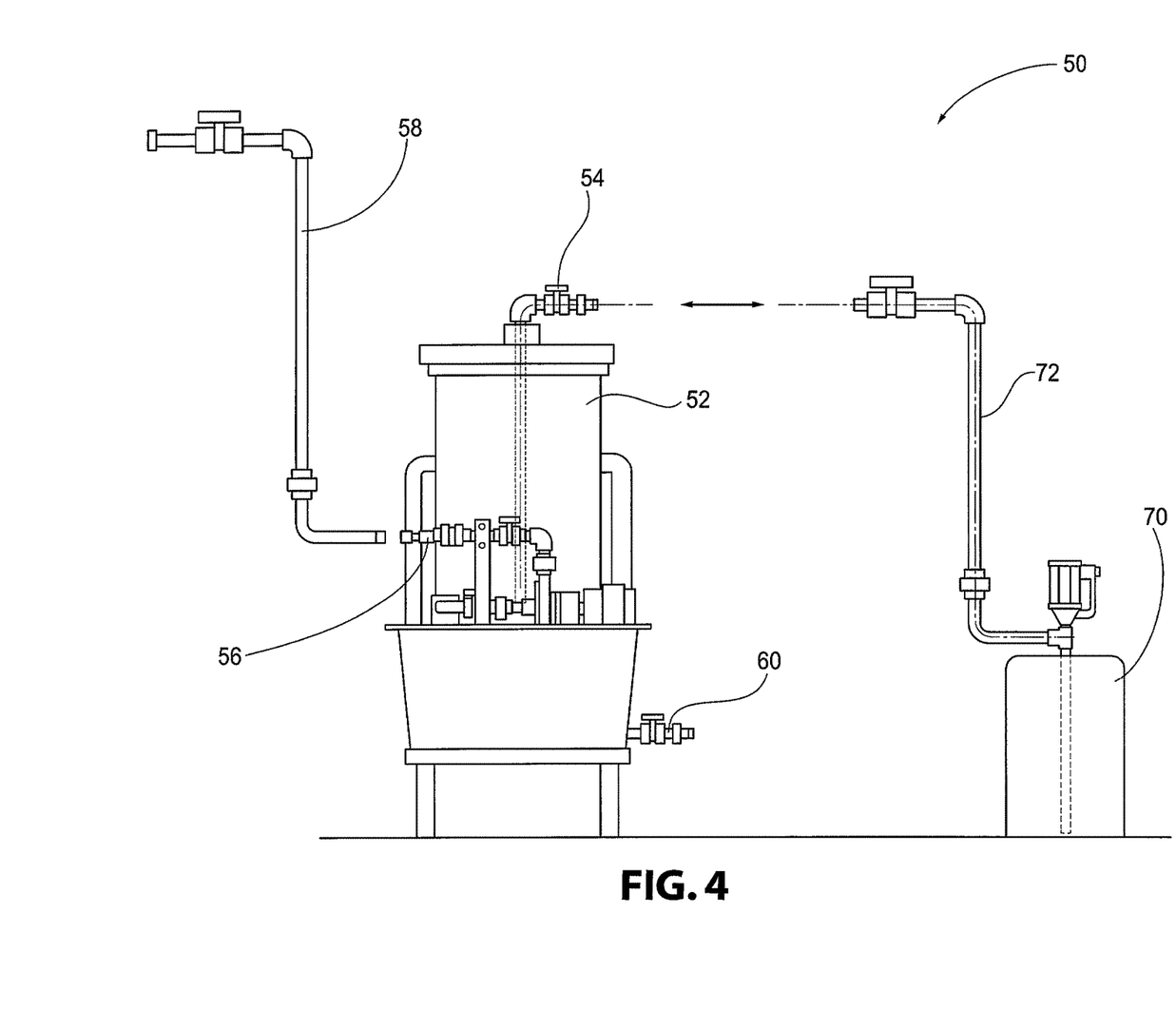
FIG. 4 is a cutaway of a two vessels for storing and diluting liquid acidic solutions according to one embodiment of the present invention.
Figure 5:
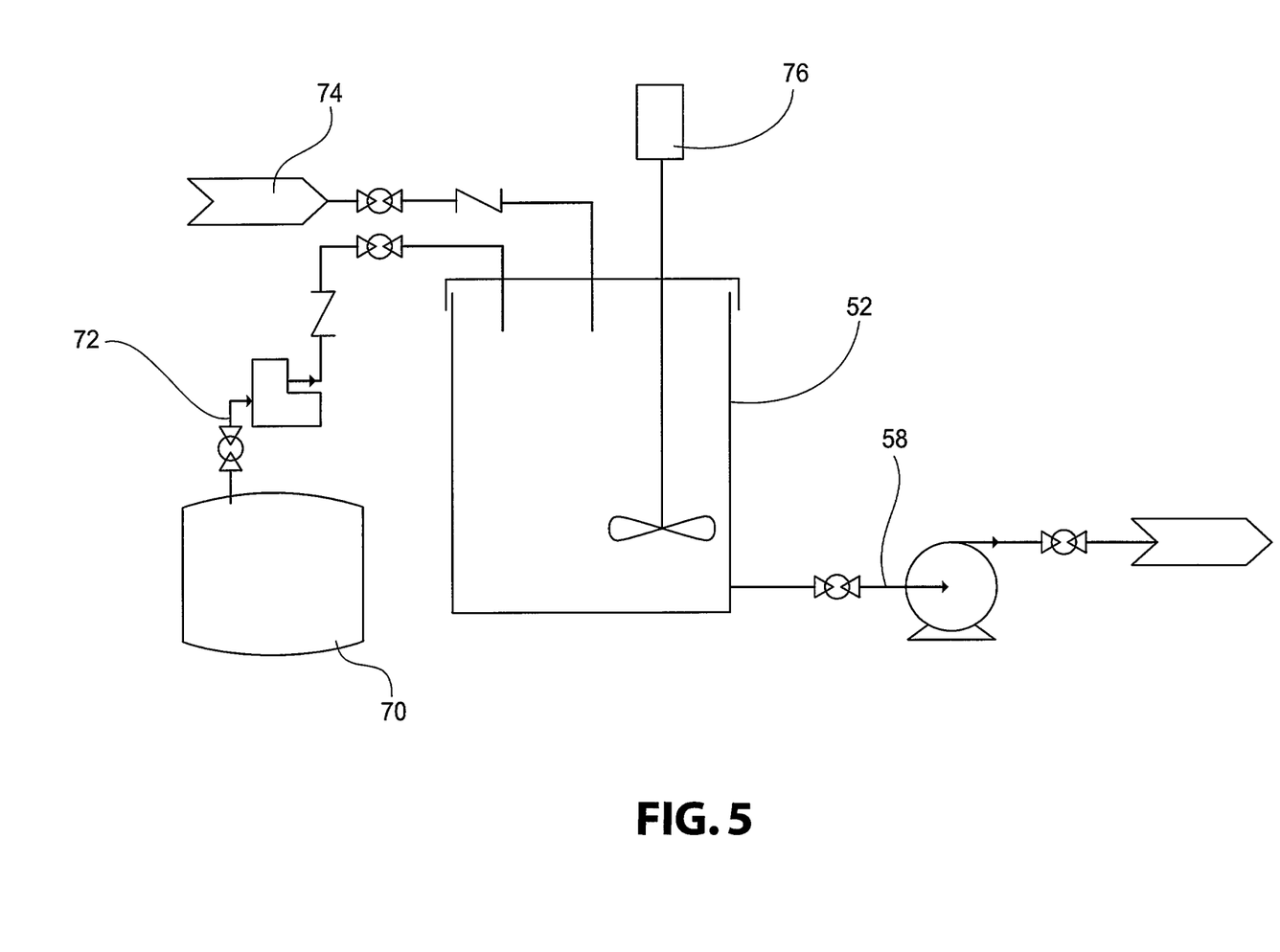
FIG. 5 is a flow diagram of two vessels and a water supply used in storing, diluting, and delivering liquid acidic solutions according to one embodiment of the present invention.

In certain embodiments, as shown in FIG. 4, the means 50 for distributing the liquid acidic solution, or mixture of liquid acidic solutions, includes a first vessel 52, as described above, and a second vessel 70 with an acid transfer line 72 that can be connected to the liquid acid inlet 54 of the first vessel 52. A concentrated liquid acidic solution can be transferred from the second vessel 70 and into the first vessel 52 where it is diluted to a lower concentration. The diluted acidic solution can then be distributed into the downcomer pipe 26 and/or purge line 34. FIG. 5 illustrates a flow diagram of this process. As shown in FIG. 5, a water supply 74 can be connected to the water inlet 60 of the first vessel 52. The first vessel 52 can optionally include a mixing device 76 to mix the concentrated liquid acidic solution with water. This arrangement allows for storage and dilution of concentrated liquid acidic solutions on-site at the wastewater facility.

The liquid acidic solutions used with the present invention can include, but are not limited to, volatile liquid acids, and acidic anhydrides in some embodiments, that will evaporate or vaporize above a certain concentration within the conditions of the aeration system 10 to which it is distributed. As used herein, the use of "evaporation" and "vaporization" encompasses the term fume. The evaporation or vaporization of the liquid acidic solution can include transforming the free flowing liquid solution into gaseous form, atomized form, aerosol form, or a combination thereof.

In certain embodiments, the liquid acidic solution or mixture of liquid acidic solutions include liquid acids that will evaporate or vaporize above acid concentrations of 10% or greater by weight, or 15% or greater by weight, or 20% or greater by weight, within the conditions of the aeration system 10 to which it is distributed. In some embodiments, the liquid acidic solution or mixture of liquid acidic solutions include a liquid acidic solution having an acid concentration of 10% or greater by weight, or a liquid acidic solution having an acid concentration of 12% or greater by weight, or a liquid acidic solution having an acid concentration of 15% or greater by weight, or a liquid acidic solution having an acid concentration of 20% or greater by weight. Further, the liquid acidic solution or mixture of liquid acidic solutions can also include a liquid acidic solution having an acid concentration from 10% to 60% by weight, or from 10% to 50%, or from 10% to 40% by weight, or from 10% to 30% by weight, or from 12% to 30% by weight, or from 15% to 25% by weight. All sub-ranges are also included as previously described.

The liquid acidic solutions can also include, but are not limited to, aqueous liquid acidic solutions that comprise liquid acids mixed with water. In some embodiments, a desired acid concentration of the liquid acidic solution can be prepared by mixing a concentrated liquid acid solution with water to obtain a desired acid concentration. For example, a concentrated liquid acid solution can be mixed with water at a volume ratio of concentrated liquid acid solution to water of 1:0.2 to 1:5, or 1:0.5 to 1:4, or 1:1 to 1:3, or 1:1 to 1:2, in order to obtain a desired acid concentration such as any of the concentrations described herein. Such liquid acidic solutions can be prepared by methods known in the art.

The types of liquid acidic solutions or mixture of acidic solutions will be chosen based on the fouled diffusers to be cleaned. Non-limiting examples of suitable liquid acidic solutions include hydrochloric acid solutions such as aqueous liquid hydrochloric acid solutions, formic acid solutions such as aqueous liquid formic acid solutions, or combinations thereof. The hydrochloric acid solutions can comprise, but is not limited to, a hydrochloric acid concentration of at least 10% by weight, such as from 10% to 37% by weight, or from 10% to 32% by weight, or from 10% to 30% by weight, or from 12% to 30% by weight, or from 15% to 30% by weight, or from 15% to 25% by weight. The formic acid solution can comprise, but is not limited to, a formic acid concentration of at least 20% by weight, such as from 20% to 50% by weight, or from 25% to 40% by weight, or from 25% to 35% by weight. The liquid acidic solutions can be provided to a wastewater facility at the desired concentration or the liquid acidic solutions can be prepared to the desired concentration on-site at the wastewater facility as previously described.

The liquid acidic solutions can also be chosen based on degrees Baume. In some embodiments, the liquid acidic solution includes, but is not limited to, a liquid hydrochloric acid solution comprising a degrees Baume of 6.5 to 22.5 or from 6.5 to 20 or from 8 to 19, or from 8 to 16, or from 8 to 13, or from 10 to 13. The liquid acidic solution can also include, but is not limited to, a liquid hydrochloric acid solution comprising a molarity (mol/dm$^3$) of 2.9 mol/dm$^3$ to 12 mol/dm$^3$, or from 2.9 mol/dm$^3$ to 10 mol/dm$^3$, or from 2.9 mol/dm$^3$ to 9.5 mol/dm$^3$, or from 4.5 mol/dm$^3$ to 9.5 mol/dm$^3$, or from 4.5 mol/dm$^3$ to 7.8 mol/dm$^3$, or from 6 mol/dm$^3$ to 9.5 mol/dm$^3$, or from 7.8 mol/dm$^3$ to 10 mol/dm$^3$.

Referring to FIG. 1, the aeration system 10 can further include a central process controller 80. The central process controller 80 can be used to control the water treatment process, the diffuser cleaning process, or any other process the aeration system 10 is designed to perform. Non-limiting examples of central process controllers 80 include a programmable logic controller, a microprocessor, and/or any other like device capable of processing data. For instance, the central process controller 80 can include a central computing unit having a set of programmable instructions that when executed by a processor implements or facilitates certain processing steps of the aeration system 10.

In certain embodiments, the present invention includes a method of cleaning fouled diffusers 32 in an aeration system 10. The aeration system 10 can include, but is not limited to, the aeration system 10 previously described. As such, the aeration system 10 includes a reservoir 14 that holds a body of water such as wastewater, a downcomer pipe 26 that extends vertically into the reservoir 14 and which is connected to an air manifold 28, air distribution pipes 30 extending out from the manifold 28, and a plurality of diffusers 32 supported by the air distribution pipes 30. The aeration system 10 can also include any of the components and features previously described, such as a purge line 34.

Figure 6:
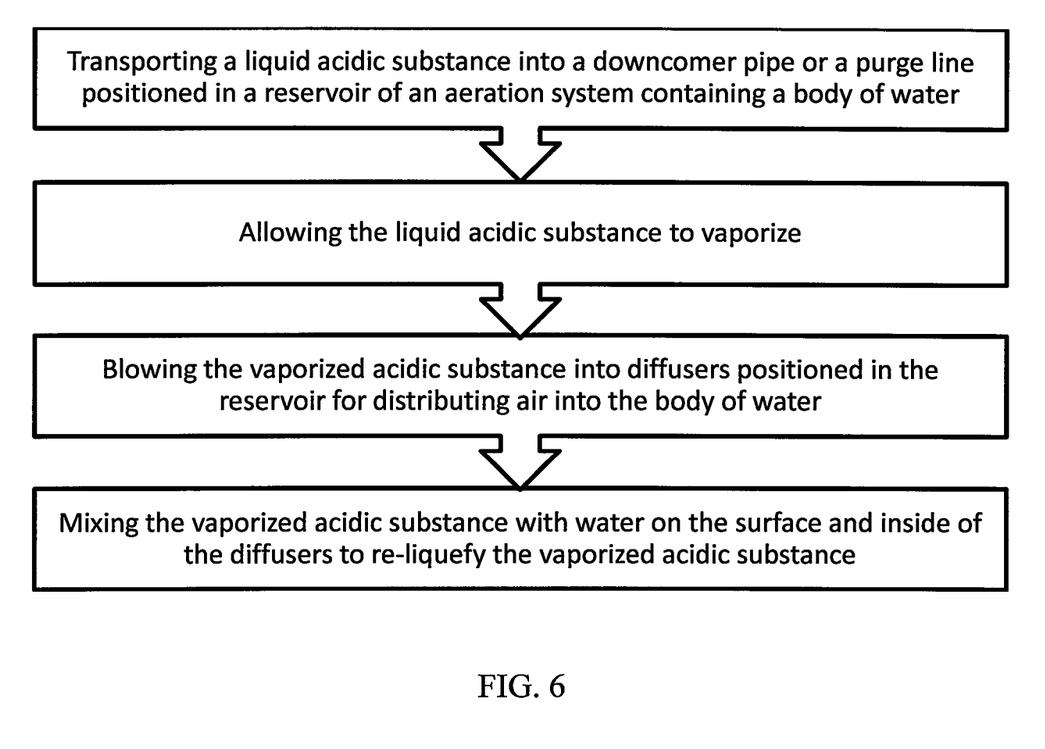
FIG. 6 is a flow chart of a method of cleaning fouling from aeration systems according to one embodiment of the present invention.

As illustrated by the flow diagram of FIG. 6, the method of cleaning fouled diffusers 32 in an aeration system 10 can include a step of transporting a liquid acidic solution into a downcomer pipe 26 and/or a purge line 34 positioned in a reservoir 14 containing a body of water. The liquid acidic solution can include any of the liquid acidic solutions previously described. The acidic solutions used with a particular aeration system 10 will be chosen based on the types of diffusers and fouling present. As such, in accordance with one embodiment of the present invention, the method can optionally first include testing fouled diffusers 32 to determine the liquid acidic solution that should be used to clean the fouled diffusers 32.

The step of transporting the liquid acidic solution into the downcomer pipe 26 and/or purge line 34 can include the previously described means 50 for distributing the liquid acidic solution. Thus, in one embodiment, the liquid acidic solution can be transported into the downcomer pipe 26 and/or purge line 34 by vessel 52 having an acid distribution line 58 that can be connected to a fluid inlet line 62 in fluid communication with the downcomer pipe 26, or that can be connected to an inlet valve 64 of the purge line 34. The step of transporting the liquid acidic solution into the downcomer pipe 26 and/or purge line 34 can also utilize the second vessel 70 as shown in FIGS. 4-5.

The liquid acidic solution transported into the downcomer pipe 26 and/or purge line 34 flows into the manifold 28 and the air distribution pipes 30. In certain embodiments, the liquid acidic solution can be transported into the downcomer pipe 26 and/or purge line 34 in an amount that prevents the liquid acidic solution from entering the diffusers 32 supported by the air distribution pipes 30 in liquid form. For instance, the liquid acidic solution can be delivered into the downcomer pipe 26 and/or purge line 34 in an amount that prevents at least 90%, at least 95%, at least 98%, or 100% of the liquid acidic solution delivered into the downcomer pipe 26 and/or purge line 34 from entering the diffusers 32 in the original transported liquid form. In some of these embodiments, the liquid acidic solution is transported into the downcomer pipe 26 and/or purge line 34 in an amount sufficient to fill a ½ inch to ¾ of an inch deep in each or least some of the air distribution pipes 30. In certain embodiments, the liquid acidic solution is transported into the downcomer pipe 26 and/or purge line 34 in an amount sufficient to fill 40% or less, or 30% or less, or 25% or less, or 20% or less, or 15% or less of the total volume of each individual air distribution pipe 30 that is attached to the manifold 28. For example, the liquid acidic solution can be transported into the downcomer pipe 26 and/or purge line 34 in an amount sufficient to fill from 1% to 40%, from 1% to 30%, from 5% to 25%, from 8% to 20%, or from 10% to 15% of the total volume of each individual air distribution pipe 30 that is attached to the manifold 28. The amount of liquid acidic solution used for each cleaning process can be determined based on the total pipe length, size, and amount used to form the manifold 28 and air distribution pipes 30. The amount of liquid acidic solution used for each cleaning process can also be determined by experimenting on diffusers 32 obtained from the reservoir 14 during a pretesting step.

The liquid acidic solution can also be transported into the downcomer pipe 26 and/or purge line 34 under certain conditions. For instance, the liquid acidic solution can be transported into the downcomer pipe 26 and/or purge line 34 while air is flowing through the system 10. In such embodiments, the air flow is maintained at pressure that prevents at least 90%, at least 95%, at least 98%, or 100% of the liquid acidic solution delivered into the downcomer pipe 26 and/or purge line 34 from entering the diffusers 32 in the original transported liquid form.

After transporting the liquid acidic solution into the downcomer pipe 26 and/or purge line 34, the liquid acidic solution is allowed to evaporate or vaporize, as described in FIG. 6. In some embodiments, the air blown through the air distribution pipes 30 causes the liquid acidic solution to evaporate or vaporize at an increased rate. It is appreciated that the conditions at which the air is blown can be adjusted to increase evaporation or vaporization of the liquid acidic solution. Such conditions include, but are not limited to, increasing and/or decreasing temperature and/or pressure of the blown air. In some embodiments, at least 80%, at least 90%, at least 95%, or at least 98% of the liquid acidic solution delivered into the downcomer pipe 26 and/or purge line 34 evaporates/vaporizes into the diffusers 32.

Next, the evaporated/vaporized acidic solution is transferred into the pores or holes and slits of the diffusers 32 by the air blowing through the air distribution pipes 30. In some embodiments, at least a portion of the evaporated/vaporized acidic solution can dissolve and/or destroy fouling caused by type 1 fouling and/or type 2 fouling. As previously indicated, the diffusers 32 are submerged within the body of water contained in the reservoir 14. In some embodiments, at least a portion of the evaporated/vaporized acidic solution can mix with water within and on the surface of the diffusers 32 and re-liquefy to dissolve and/or destroy fouling caused by type 1 fouling and/or type 2 fouling. That is, the re-liquefied acidic solution can dissolve mineral scale (e.g., $CaCO_3$) and kill or destroy bacteria found on and within the diffusers 32. The fouling is then removed from the diffusers 32 from the air blown through the diffusers 32.

It was found that the use of liquid acidic solutions with the cleaning method described herein can effectively clean and remove fouling of all (i.e., 100%), essentially all (i.e., 90%-100%), or substantially all (i.e., 75%-100%) of the diffusers 32 used in an aeration system 10 in a cost-effective, short period of time. Moreover, the method described herein does not require and can be completely free of additional materials such as additional channels and acid transfer lines attached to the manifold 28, air distribution pipes 30, and/or diffusers 32.

In addition, the method of cleaning fouled diffusers 32 can be performed before, during, or after a wastewater treatment process. For instance, the method can be performed in-situ during a water treatment process. As used herein, the term "in-situ" refers to the steps of performing the method of cleaning fouled diffusers 32 during a water treatment process. When the method of cleaning the diffusers 32 is conducted in-situ during a water treatment process, the cleaning method can be implemented during any stage of the water treatment process.

Typically, during a water treatment process using the aeration system 10 described herein, wastewater enters the pre-reaction zone 18 where it can be pre-treated under various conditions such as aerobic, anoxic, and/or anaerobic conditions. The wastewater then flows through submerged ports 22 in the baffle wall 20 to the main reaction zone 16. The wastewater is then treated in the main reaction zone 16 under the same or different conditions as the pre-reaction zone 18. For instance, the wastewater in the main reaction zone 16 can be treated under aerobic, anoxic, and/or anaerobic conditions.

Under aerobic conditions, dissolved oxygen is introduced into a body of water contained in the reservoir 14 and mixed with the influent wastewater and various microorganisms. The aerobic conditions convert ammonium and organic nitrogen found in the wastewater to nitrate. This is commonly referred to as nitrification. As used herein, ammonium ($NH_4$) is used to describe ammonia ($NH_3$), ammonia as nitrogen ($NH_3$—N), and ammonium as nitrogen ($NH_4$—N). Thus, during an aerobic treatment phase, the diffusers 32 distribute oxygen to the wastewater in the pre-reaction zone 18 and/or main reaction zone 16 to convert ammonium and organic nitrogen found in the wastewater to nitrate.

Under anoxic conditions, nitrate is converted to nitrogen gas, and under anaerobic conditions, phosphorous is removed by mixing wastewater and microorganisms in the absence of both dissolved and chemically bound oxygen. The aerobic, anoxic, and/or anaerobic conditions can be used alone or in any combination to treat the wastewater.

After the wastewater is treated, suspended solids are allowed to settle to the bottom of the reservoir 14. A decanter 40, or similar apparatus, can then be used to draw off the clarified supernatant and discharge it to the effluent line. While the decanter 40 is removing clarified supernatant, wastewater continues to flow into the reservoir 14. The treatment process can then be restarted to treat the new incoming wastewater.

As indicated, the method of cleaning the diffusers 32 can be implemented during any stage of the treatment process. In some embodiments, the method is performed during an aerobic treatment phase in which air/oxygen is delivered through the downcomer pipe 26, manifold 28, air distribution pipes 30, and diffusers 32, and into the body of water contained in the reservoir 14.

The method of cleaning the diffusers 32, as well as the water treatment process, can be controlled manually, semi-automatically, or fully automatically. As used herein, "semi-automated" and like terms refer to a system or method that is activated by the operator and requires further manual assistance/input to function properly. Further, "fully automated" and like terms refers to a system or method that does not require further manual assistance/input to function properly after activation and initial set-up by the operator.

In certain embodiments, the manual function is based on time. For instance, a water treatment facility can decide how often they would like to use the method to clean the diffusers 32 on a time basis (e.g., once a month or once a year). In some embodiments, the cleaning method is controlled semi-automatically using a pressure monitoring device which can be analog or digitalized and tied into a SCADA system. With a semi-automated analog system, an operator can manually measure the pressure increase in the system caused by fouling. The cleaning intervals can then be determined when the pressure increases a certain percent over the original base line pressure. With a semi-automated digital system, digital pressure monitoring can be used allowing the system to measure the pressure continuously and prompt the operator to clean the diffusers at a set-point pressure difference. In certain embodiments, a fully automated system is used to measure the pressure continuously, and when the set-point pressure difference is reached, it can start a cleaning cycle by itself.

The following examples are presented to demonstrate the general principles of the invention. The invention should not be considered as limited to the specific examples presented. All parts and percentages in the examples are by weight unless otherwise indicated.

Example 1

Evaluation of a Liquid Acid Cleaning Process of a Diffused Aeration System

An ICEAS™ aeration system from Sanitaire was evaluated for diffuser fouling. The system included three separate basins (basin 1, basin 2, and basin 3). Each basin had: a pre-reaction zone, a main reaction zone, and a baffle wall positioned between the pre-reaction zone and main reaction zone; a downcomer pipe, as well as a purge line, extending down into each basin and connected to a manifold; a plurality of air distribution pipes extending out from the manifold; and a plurality of diffusers supported by the air distribution pipes. The process cycle of the system was turned on and off as many as 35 times per day. The plant also had extremely hard water due to arid climate as well as a prolonged drought. Due to the hard water, on/off operation, and high ambient air temperatures, a buildup of calcium carbonate was found under the air side of the diffusers of basin 1. As a result, basin 1 exhibited an increase in operating pressure and electrical power costs, erratic operation, loss of oxygen transfer during operation, and teared diffusers. Basins 2 and 3 also exhibited increased operating pressure and coarse bubbling due to fouled diffusers.

To clean the fouled diffusers in basins 1, 2, and 3, an experimental liquid acid cleaning process was conducted. First, a carboy containing hydrochloric acid having a concentration of 30% by weight was provided. The carboy and a water supply were connected to a separate vessel. The hydrochloric acid and water were then transferred to the separate vessel and mixed with water to form a hydrochloric acid solution having a concentration of 15% to 25% by weight. An acid distribution line on the vessel was connected to a purge line of each basin. The acid solution was then transported into the purge line associated with each basin during operation of a water treatment process in accordance with the present invention. The amount of acid was added to fill a ½ inch to ¾ of an inch deep in each air distribution pipe, which was determined from the total pipe length, size, and amount used to form the manifold and air distribution pipes. The air pressure of each basin was evaluated over four days to determine whether the method cleaned the fouling from the diffusers. The results are shown in Table 1.

TABLE 1

| Day | Basin 1 Operating Pressure (psig) | Basin 2 Operating Pressure (psig) | Basin 3 Operating Pressure (psig) |
| --- | --- | --- | --- |
| 1 | Not operating, down for repairs. | 8.2 psig with one blower in operation and 9.0 psig with two blowers in operation | 8.2 psig with one blower in operation and 9.0 psig with two blowers in operation |

TABLE 1-continued

| Day | Basin 1 Operating Pressure (psig) | Basin 2 Operating Pressure (psig) | Basin 3 Operating Pressure (psig) |
|---|---|---|---|
| 2 | Repairs complete and acid injected late in day. Unknown pressure and assume 9.0 psig. | 7.6 psig with one blower in operation and 8.7 psig with two blowers in operation. Acid cleaning conducted. Pressure reduction noted shortly after. | 7.6 psig with one blower in operation and 8.7 psig with two blowers in operation. Acid cleaning conducted. Pressure reduction noted shortly after. |
| 3 | 7.0 psig | 6.6 to 7.2 psig | 6.6 to 7.2 psig |
| 4 | 6.7-7.2 psig | 6.4 to 7.2 psig | 6.5 to 7.2 psig |

As shown in Table 1, the pressure decreased for each basin after conducting the liquid acid cleaning process according to the present invention. This reduction in pressure shows that the liquid acid cleaning process removes fouling from diffusers.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. A method for cleaning diffusers in an aeration system comprising:
   a) transporting a liquid acidic solution into a downcomer pipe and/or a purge line positioned in a reservoir of an aeration system containing a body of water such that the liquid acidic solution flows into a manifold and air distribution pipes;
   b) allowing the liquid acidic solution to vaporize; and
   c) blowing the vaporized acidic solution into a plurality of diffusers supported by the air distribution pipes,
   wherein the liquid acidic solution is transported into the downcomer pipe and/or purge line in an amount sufficient to fill 40% or less of the total volume of each individual air distribution pipe.

2. The method of claim 1, further comprising d) mixing the vaporized acidic solution with water on a surface and inside the diffusers to re-liquefy the vaporized acidic solution.

3. The method of claim 2, wherein the re-liquefied acidic solution dissolves mineral scale and inorganic materials and/or kills or destroys bacteria.

4. The method of claim 1, wherein the liquid acidic solution comprises a liquid acid that vaporizes at acid concentrations of 10% by weight or greater.

5. The method of claim 1, wherein the liquid acidic solution comprises a hydrochloric acid concentration of 10% to 37% by weight, a formic acid concentration of 20% to 50% by weight, or a combination thereof.

6. The method of claim 1, wherein the liquid acidic solution is transported into the downcomer pipe and/or purge line in an amount and manner that prevents at least 90% of the liquid acidic solution delivered into the downcomer pipe and/or purge line from entering the plurality of diffusers in liquid form.

7. The method of claim 6, wherein the liquid acidic solution is transported into the downcomer pipe and/or purge line as air is flowing through the downcomer pipe, manifold, and air distribution pipes.

8. The method of claim 6, wherein the liquid acidic solution is transported into the downcomer pipe and/or purge line in step a) in an amount sufficient to fill from a ½ inch to ¾ of an inch deep in each individual air distribution pipe attached to the manifold.

9. The method of claim 8, wherein the amount of liquid acidic solution transported into the downcomer pipe and/or purge line in step a) is determined based on the total pipe length, size, and amount used to form the manifold and air distribution pipes.

10. The method of claim 1, wherein the liquid acidic solution is transported into the downcomer pipe and/or purge line by a vessel comprising an acid distribution line.

11. The method of claim 1, wherein the method for cleaning the diffusers is operated semi-automatically or fully automatically.

12. The method of claim 1, wherein the method for cleaning the diffusers is conducted in-situ during a water treatment process.

13. The method of claim 1, wherein the reservoir comprises a pre-reaction zone, a main reaction zone, and a baffle wall separating the pre-reaction zone and main reaction zone, said baffle wall comprising slots that allow fluid to flow between the pre-reaction zone and main reaction zone.

* * * * *